(12) United States Patent
Sebastian et al.

(10) Patent No.: US 6,640,172 B2
(45) Date of Patent: Oct. 28, 2003

(54) DUAL GAIN ALGORITHM FOR FOUR WHEEL STEERING SYSTEM

(75) Inventors: Reeny Sebastian, Saginaw, MI (US); Steven Donald Klein, Munger, MI (US); Scott M. Wendling, Montrose, MI (US)

(73) Assignee: Delphi Technologies, Inc., Troy, MI (US)

( * ) Notice: Subject to any disclaimer, the term of this patent is extended or adjusted under 35 U.S.C. 154(b) by 51 days.

(21) Appl. No.: 09/966,722

(22) Filed: Sep. 28, 2001

(65) Prior Publication Data

US 2003/0028301 A1 Feb. 6, 2003

Related U.S. Application Data

(60) Provisional application No. 60/309,375, filed on Aug. 1, 2001.

(51) Int. Cl.$^7$ .............................................. G06F 17/00
(52) U.S. Cl. ............................ 701/41; 701/42; 180/445
(58) Field of Search ........................... 701/41, 42, 43; 180/408, 410, 411, 412, 413, 422, 445

(56) References Cited

U.S. PATENT DOCUMENTS

| | | | | |
|---|---|---|---|---|
| 4,976,328 A | * | 12/1990 | Ohmura | 180/412 |
| 5,060,743 A | * | 10/1991 | Oda et al. | 180/415 |
| 5,101,922 A | * | 4/1992 | Ohmura | 180/445 |
| 5,147,004 A | * | 9/1992 | Weisgerber et al. | 180/53.6 |
| 5,456,330 A | * | 10/1995 | Kojima et al. | 180/445 |
| 5,508,921 A | * | 4/1996 | Chikuma et al. | 701/41 |
| 5,810,108 A | | 9/1998 | Jung et al. | 180/404 |
| 5,957,987 A | * | 9/1999 | Sudo et al. | 701/41 |
| 5,964,819 A | * | 10/1999 | Naito | 701/72 |
| 5,992,556 A | | 11/1999 | Miller | 180/446 |

* cited by examiner

*Primary Examiner*—Tan Q. Nguyen
(74) *Attorney, Agent, or Firm*—Michael D. Smith (57) ABSTRACT

A vehicle steering system coupled to a steerable wheel, comprising a steering rack linked to said steerable wheel, an electric motor having an output shaft engaged with the steering rack for controlling the steerable wheel. The system also includes a position sensor configured to measure an actual steerable wheel angle of the steering rack and thereby the steerable wheel, a return spring, where the return spring is biased so as to provide a returning force to the steering rack. Finally, the system includes a controller that provides a command to the electric motor resulting in a torque, the command is responsive to the actual steerable wheel angle, a desired steerable wheel angle, and a command direction.

60 Claims, 6 Drawing Sheets

DUAL GAIN ALGORITHM FOR FOUR WHEEL STEERING SYSTEM

CROSS-REFERENCE TO RELATED APPLICATIONS

This application claims the benefit of U.S. provisional application No. 60/309,375 filed Aug. 1, 2001 the contents of which are incorporated by reference herein in their entirety.

BACKGROUND

A four wheel steering system steers the front and rear wheels of an automobile. More specifically, an electrically driven, rack and pinion rear wheel steer system produces a desired rear wheel steering angle to improve directional stability at high speeds and steering stability at low speeds. Four wheel steering methods include a "in phase" method and a "reverse phase" steering method. The in phase steering method reduces vehicle yaw (an angular speed about a vertical line passing through a center of gravity of a vehicle) by steering the front and rear wheels in the same direction, and improves vehicle safety due to the reduced yawing. The reverse phase steering method achieves better maneuverability at low speeds by steering the front and rear wheels in differential directions, thereby reducing the turning radius of the vehicle.

In a four wheel or rear wheel steering system a mechanism (such as a spring) may be employed to assist in ensuring that the rear wheels return to a neutral position under inoperative conditions. However, if the rear wheels overshoot an accurate position due to the force of the return spring, undesirable vehicle characteristics and conditions may result.

BRIEF SUMMARY

A vehicle steering system coupled to a steerable wheel, comprising a steering rack linked to said steerable wheel, an electric motor having an output shaft engaged with the steering rack for controlling the steerable wheel. The system also includes a position sensor configured to measure an actual steerable wheel angle of the steering rack and thereby the steerable wheel, a return spring, where the return spring biased so as to provide a returning force to the steering rack. Finally, the system includes a controller that provides a command to the electric motor resulting in a torque, the command is responsive to the actual steerable wheel angle, a desired steerable wheel angle, and a command direction.

A method for controlling an angle of a steerable wheel in a vehicle with electric power steering with an electric motor and a return spring, comprising determining a desired steerable wheel angle, obtaining an actual steerable wheel angle of the vehicle, determining a direction indicative of a command direction for the electric motor, generating the command, responsive to the desired steerable wheel angle, the actual steerable wheel angle, and the command direction. Where the command results in a torque generated by the electric motor operably connected to the steerable wheel for controlling the actual steerable wheel angle.

BRIEF DESCRIPTION OF THE DRAWINGS

The present invention will now be described, by way of example only, with reference to the accompanying drawings which are meant to be exemplary, not limiting, and wherein like elements are numbered alike in several Figures, in which.

DESCRIPTION OF THE PREFERRED EMBODIMENT

An exemplary embodiment is described herein by way of illustration as may be applied to a vehicle and more specifically a vehicle steering system. While a preferred embodiment is shown and described, it will be appreciated by those skilled in the art that the invention is not limited to the embodiment and application described herein, but also to any vehicle with steerable wheels and where rear wheel steering is employed. Moreover, while an exemplary embodiment is disclosed and illustrated with reference to a particular implementation, it will be appreciated that such illustration should not be construed as limiting. Those skilled in the art will appreciate that a variety of potential implementations and configurations are possible.

Figure 1:
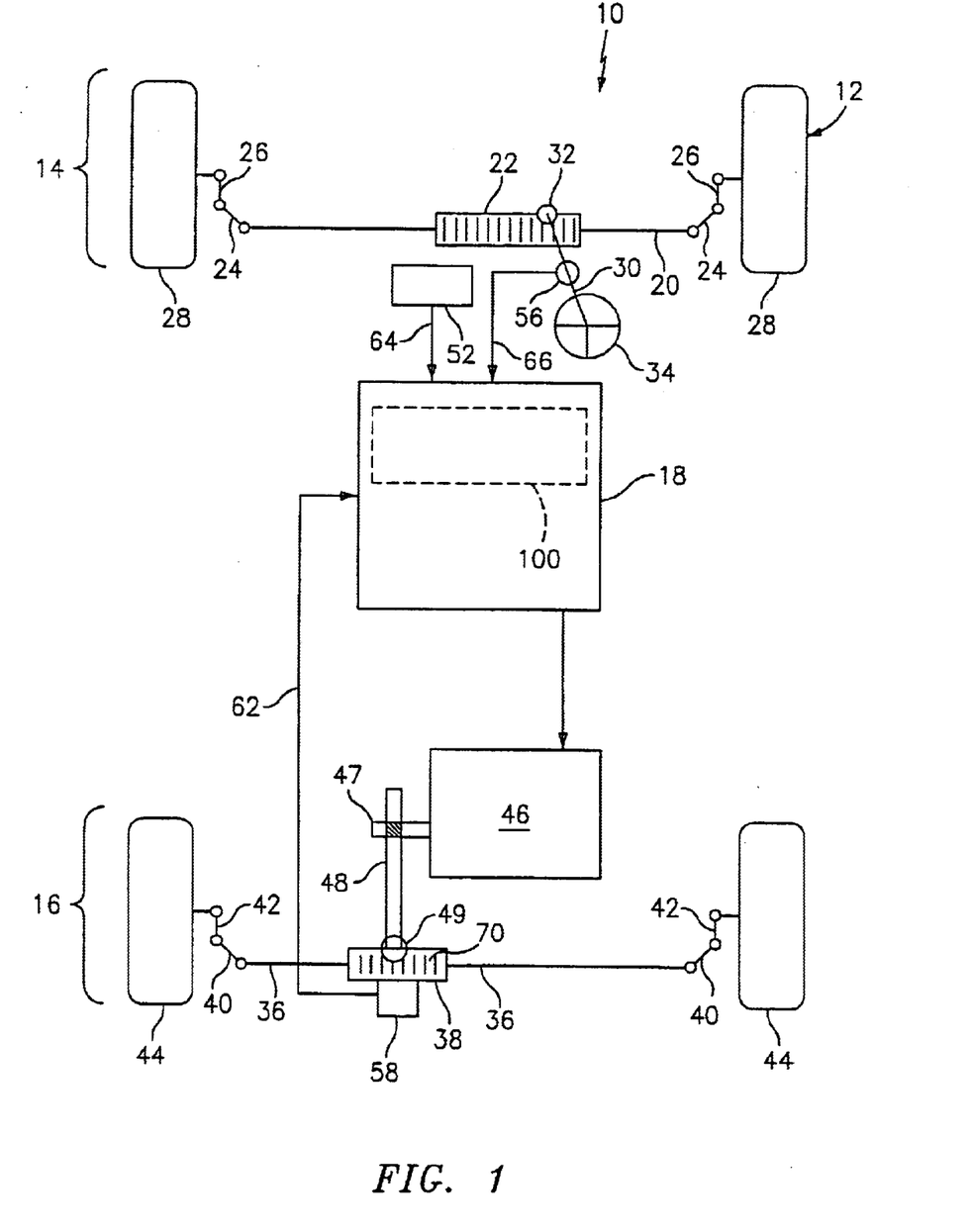
FIG. 1 is a schematic diagram of a four wheel, electric power steering system suitable for implementation with an exemplary embodiment.
Figure 2:
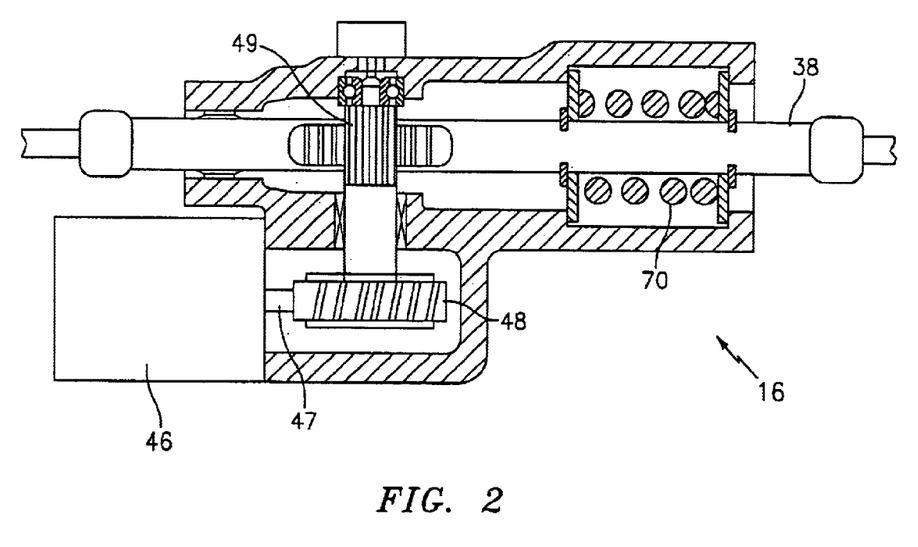
FIG. 2 is a cutaway view of a rear steering mechanism.

Referring to FIGS. 1 and 2, a diagram partially depicting a vehicle steering control system 10 is depicted, hereinafter referred to as system 10. The system 10 includes, but is not limited to, a controller 18 coupled to various sensors and interfaces for performing a variety of processes prescribed by the desired controlling functions. FIG. 1 depicts a vehicle employing rear wheel steering and the apparatus for executing the prescribed steering functions.

System 10 is incorporable into a motor vehicle 12 to provide directional control to motor vehicle 12 and is configurable to enhance steering of the motor vehicle 12. System 10 comprises a front steering mechanism, shown generally at 14, a rear steering mechanism, shown generally at 16, and a controller 18 in communication with front steering mechanism 14 and rear steering mechanism 16. Although system 10 is described as being applicable to a rack and pinion steering arrangement, system 10 can be incorporable into other steering arrangements including, but not being limited to, integral gear steering systems.

Front steering mechanism 14 comprises a rack shaft 20, a front steering rack 22 disposed intermediate opposing ends of rack shaft 20, a tie rod 24 disposed on each opposing end of rack shaft 20, a knuckle arm 26 connected to each tie rod 24, and a front steerable wheel 28 rotatably disposed on each knuckle arm 26. Rack shaft 20, tie rods 24, and knuckle arms 26 are configured such that front steerable wheels 28 can pivot in unison relative to a body of motor vehicle 12 to steer or to effect a change in the direction of travel of motor vehicle 12 while motor vehicle 12 is moving.

Front steering mechanism 14 further comprises a mechanism through which an operator can effectuate a desired change in the direction of travel of motor vehicle 12. Such a mechanism comprises a steering column 30 disposed in operable communication at one end thereof with front steering rack 22 through a pinion 32 and at an opposing end thereof with a steering device 34. Steering device 34 may be a hand steering wheel. Manipulation of steering device 34, e.g., rotation of the hand steering wheel, causes the axial rotation of steering column 30, which in turn causes the rotation of pinion 32. Rotation of pinion 32, through the engagement of front steering rack 22 and pinion 32, effectuates the lateral translation of front steering rack 22 relative to the body of motor vehicle 12. The lateral translation of front steering rack 22 causes front steerable wheels 28 to angle relative to the body of motor vehicle 12, thereby altering the direction of travel of motor vehicle 12 while motor vehicle 12 is moving. A power steering assist may also be provided to the front wheels 28 with an electric or hydraulic actuator (not shown). Referring to FIG. 2, a partial cutaway view of a rear steering mechanism is depicted. Rear steering mechanism 16 comprises a rear rack shaft 36, a rear steering rack 38 disposed intermediate opposing ends of rack shaft 36, a tie rod 40 disposed on each opposing end of rack shaft 36, a knuckle arm 42 connected to each tie rod 40, and a rear steerable wheel 44 rotatably disposed on each knuckle arm 42. Rear rack shaft 36, tie rods 40, and knuckle arms 42 are configured such that rear steerable wheels 44, like front steerable wheels 28, can be pivoted in unison relative to the body of motor vehicle 12 to steer motor vehicle 12 upon lateral translation of rear steering rack 38.

Rear steering mechanism 16 further comprises a mechanism through which rear steerable wheels 44 can similarly be pivoted. Such a mechanism comprises a motor 46 operably connected to rear steering rack 38 through a drive mechanism 48. Drive mechanism 48, through a pinion 49, transfers the rotational motion of a rotor shaft 47 of motor 46 to linear motion of rear steering rack 38, which effectuates the lateral motion of rack shaft 36 and, ultimately, the pivoting of rear steerable wheels 44. In the embodiment depicted in FIG. 1, the controller 18 may also be used to provide a torque command to electric motor 46. Accordingly, a displacement sensor 58 is used to detect the displacement of rear rack shaft 36, and hence determine the rear steering angle for feedback to the controller 18.

Motor vehicle 12 is further provided with a steering angle sensor 56, and transmits to controller 18 a handwheel angle signal 66 indicative of a front wheel angle. A rear rack shaft displacement sensor 58 detects the displacement of its corresponding rear rack shaft 36 from a reference position, which is the position in which each rear steerable wheel 44 is aligned and rotatable and transmits a rear wheel angle signal 62 to controller 18. The front wheel angle signal and rear wheel angle signal 62 may be derived from a variety of sources including, but not be limited to, various encoders, other position sensors such as potentiometers, synchros, resolvers, magnetic and optical transducers, and the like, including combinations of the foregoing Controller 18 is disposed in communication with the various systems of motor vehicle 12. Controller 18 receives informational signals from each of the systems, quantifies the received information, and provides an output command signal in response thereto, in this instance, for example, to the rear steering mechanism 16 through motor 46. Communications, informational signals and commands as such may be employed by controller 18 to facilitate execution of control algorithms including, but not limited to, four wheel steering control, and/or the dual gain algorithm 100 disclosed herein.

In order to perform the prescribed functions and desired processing, as well as the computations therefore (e.g., the execution of the dual gain algorithm(s) 100, and the like), controller 18 may include, but not be limited to, a processor (s), computer(s), memory, storage, register(s), timing, interrupt(s), communication interfaces, and input/output signal interfaces, and the like, as well as combinations comprising at least one of the foregoing. For example, controller 18 may include input signal filtering to enable accurate sampling and conversion or acquisitions of such signals from communications interfaces. Additional features of controller 18 and certain processes therein are thoroughly discussed at a later point herein.

Figure 3:
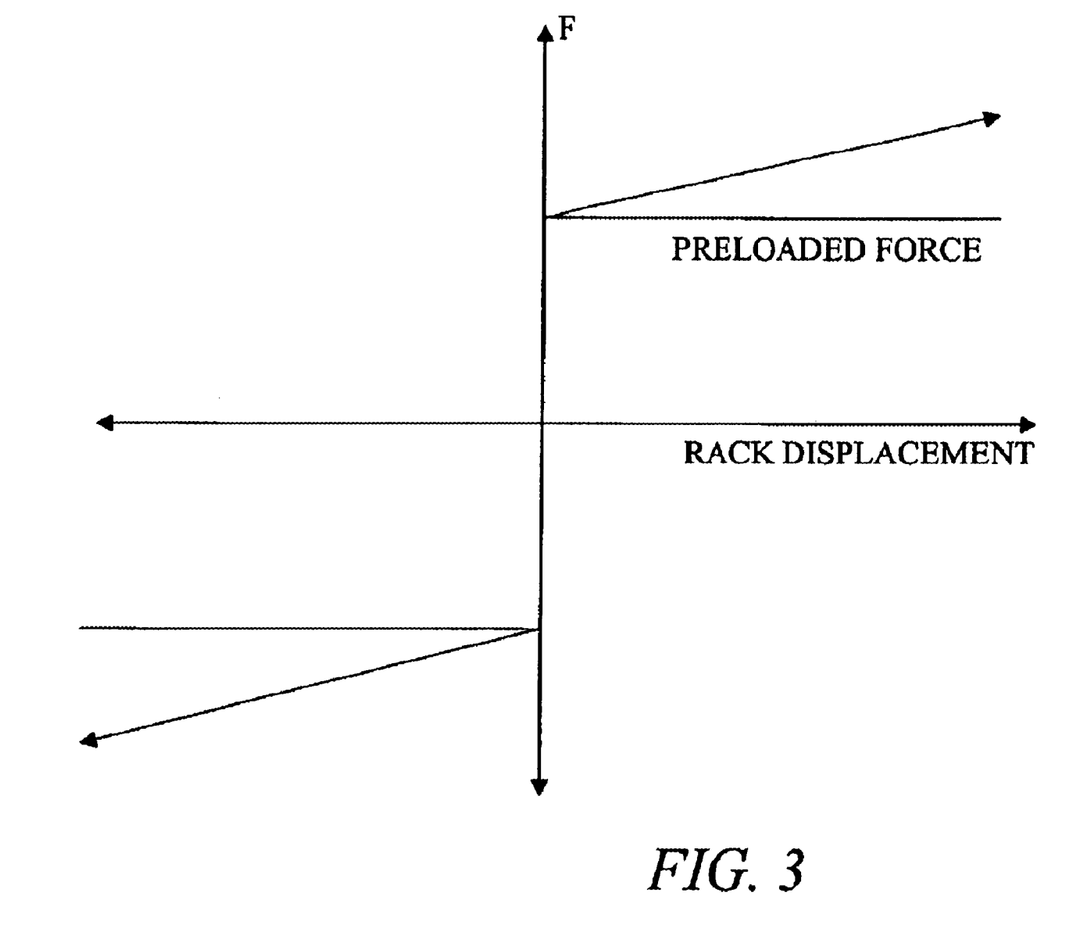
FIG. 3 depicts return spring forces as a function of rear wheel rack displacement.

Continuing with FIGS. 1 and 2, a return spring 70 provides a force that returns the rear steering rack 38 to a center, or neutral position under certain conditions in the rear steering system. The return spring 70, in an exemplary embodiment also is disposed in the rear steering rack 38 with a bi-directional preload. The preload is configured to force the steering rack 38 to the center position when the motor 46 is not maintaining a particular position, and thereby the rear steering rack 38 in a particular position. FIG. 3 is a graph depicting the spring force as a function of rack displacements typical of an existing system. It will be evident that once the rear steering rack 38 is displaced from the center position, the force required thereafter to displace the rear steering rack 38 is not directionally symmetrical. That is, displacements in the direction of further compression of return spring (e.g., against the return spring 70) will require additional force, as the displacement is opposed by the spring force, while displacements in the direction of extension (less compression) of the return spring e.g. with the return spring 70) will require less force, as the displacement is aided by the spring force. A system and methodology for including a return spring in a steering system is described in Jung et al. U.S. Pat. No. 5,810,108, dated Sep. 22, 1998.

Figure 4:
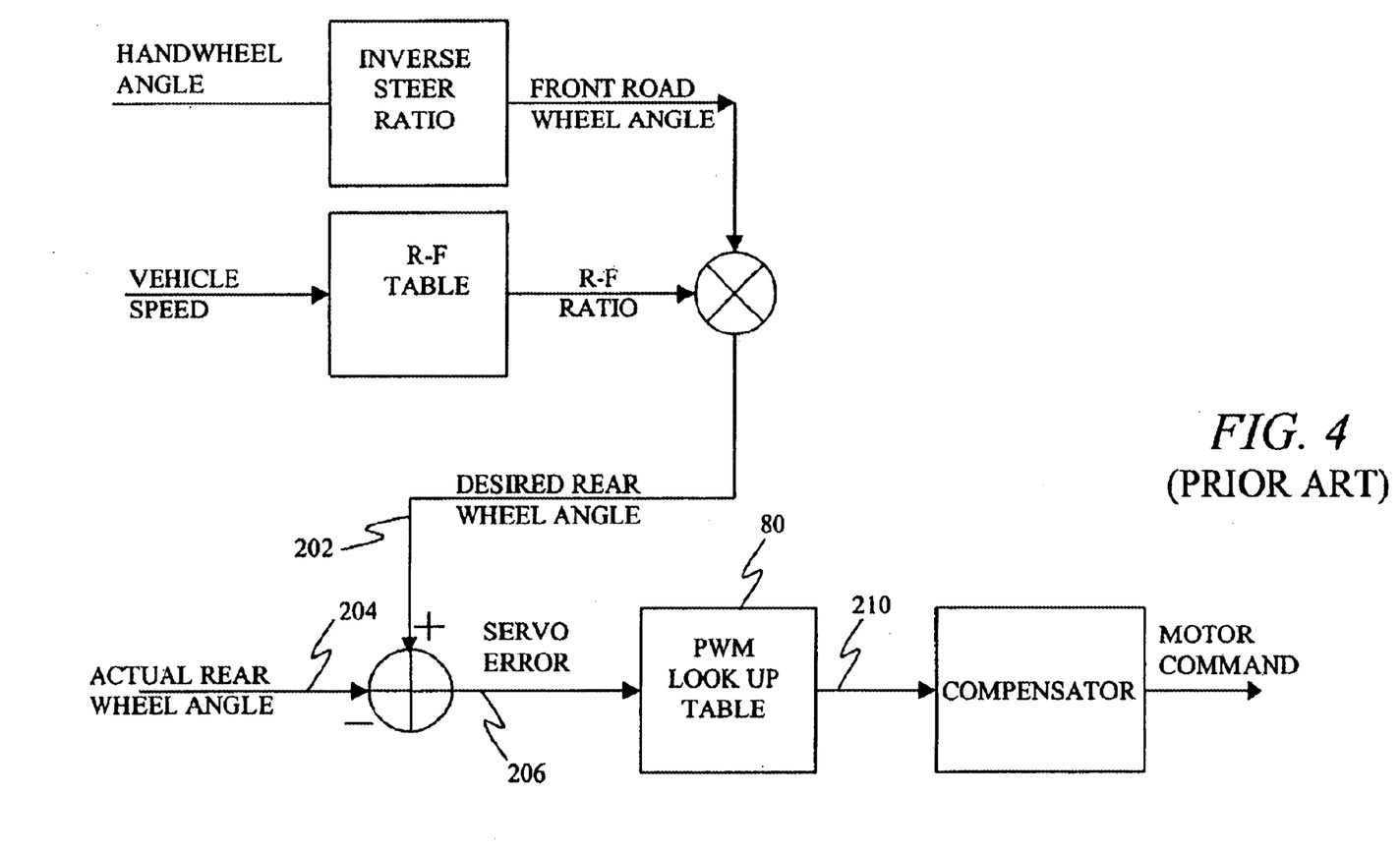
FIG. 4 is block diagram of an existing control algorithm for four wheel steering.
Figure 5:
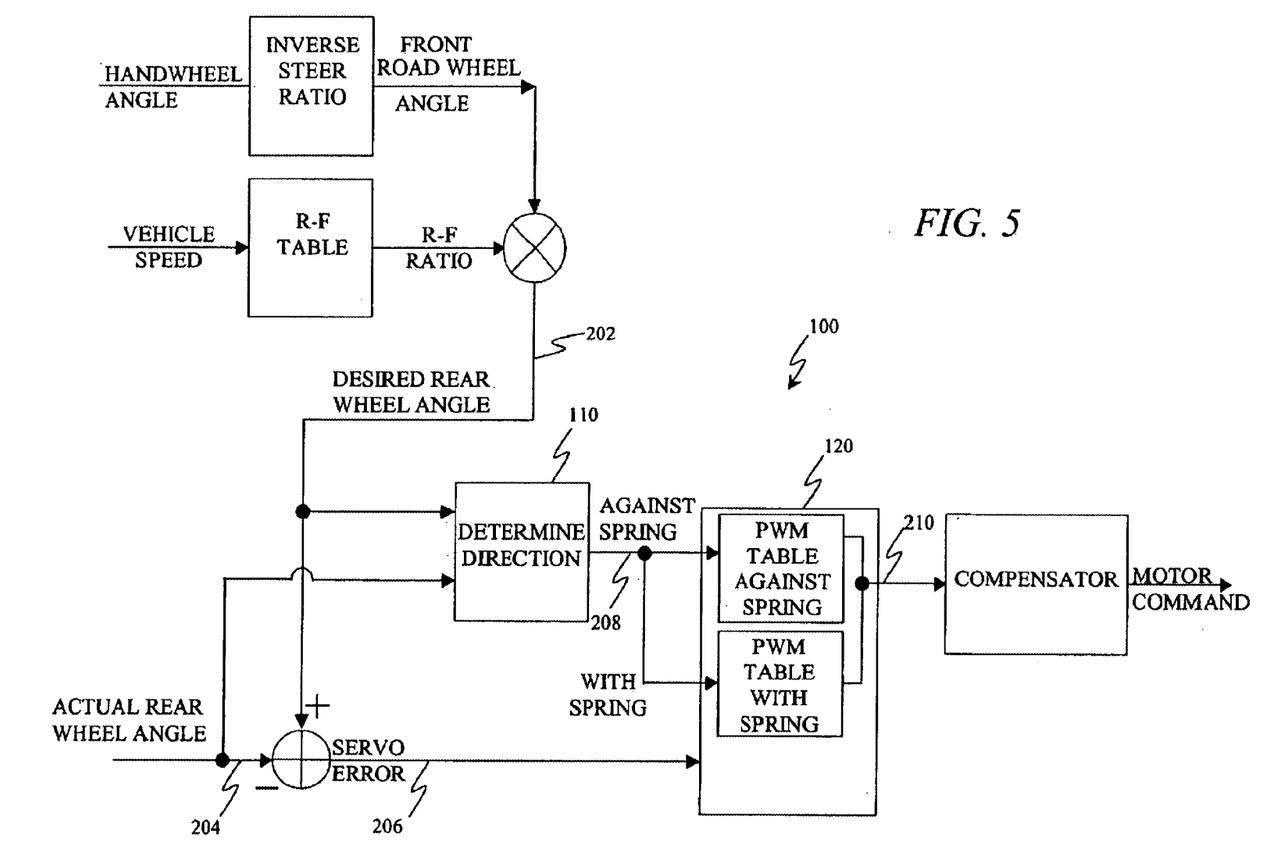
FIG. 5 is a block diagram illustrating a control algorithm for four wheel steering of an exemplary embodiment.

FIG. 4 depicts an existing control block diagram for four wheel steering. A system and methodology for rear wheel steering control was described in commonly assigned U.S. Pat. No. 4,828,061 dated May 09, 1989 by Kimbrough, et al., which is incorporated by reference herein in its entirety. In the existing architecture and in the exemplary embodiment disclosed herein, a hand wheel angle is measured by steering angle sensor 56 and in proportion thereto, a front wheel angle may be determined. Based upon vehicle speed and front wheel angle a desired rear wheel angle 202 is computed. The desired rear wheel angle 202 is compared to the measured, actual rear wheel angle 204 to formulate a servo error 206. The existing control system while well adapted for its requirements may exhibit the abovementioned overshoot under certain operating conditions. To address this concern, an exemplary embodiment of a dual gain algorithm is disclosed, which incorporates determination of the translational direction of the return spring 70 to facilitate damping and enhance control. Referring now to FIG. 5 an exemplary embodiment of the dual gain algorithm implementation is depicted. It will be evident that the existing control architecture of FIG. 4 has been modified to include the dual gain capability of the disclosed embodiment. It is noteworthy to recognize the control diagram of FIG. 5 is similar to that of FIG. 4 with the inclusion of the spring direction process 110 and a modification of the PWM look up table 80 (FIG. 4).

Referring now the to spring direction process 110 wherein the translation direction of the return spring 70 and ultimately the rear wheels is determined. A direction signal 208 indicative of the command direction to the motor 46 and therefore the direction of the return spring is generated and transmitted to the motor pulse width modulation (PWM) look up process 120. In addition the servo error 206 is also transmitted to the pulse width modulation (PWM) look up process 120. Depending upon the direction and servo error 206 a particular set of look up data is utilized in the PWM look up process 120. The values of the look up table(s) may then be tuned to eliminate undesirable response characteristics of the motor 46 and system 10.

Turning now to a detail view of the direction process 110, the direction may be ascertained from desired/calculated rear wheel angle and the rear wheel angle signal 62. If the rear wheel angle signal 62 indicates that the actual rear wheel angle is greater than zero degrees and if the desired rear wheel angle is greater than the actual rear wheel angle, then the direction is against the return spring 70. However, if the actual rear wheel angle is greater than zero degrees and if the desired rear wheel angle is less than the actual rear wheel angle, then the command direction is with the return spring 70. Conversely, if the rear wheel angle signal 62 indicates that the actual rear wheel angle is less than zero degrees and if the desired rear wheel angle is less than the actual rear wheel angle, then the command direction is against the return spring 70. Likewise, if the actual rear wheel angle is less than zero degrees and if the desired rear wheel angle is greater than the actual rear wheel angle, then the direction is with the return spring 70. A direction signal 208 indicating the direction of travel of the return spring 70 as determined above is transmitted to the motor pulse width modulation (PWM) look up process 120.

Continuing now with FIG. 5 a detailed disclosure of the PWM look up process 120 is considered. It will be evident that this process is similar to the PWM look up table 80 depicted in FIG. 4. In an exemplary embodiment, the PWM look up process 120 employs one or more selectable look up tables to facilitate generation of a voltage command 210 for the motor 46 (FIG. 1). A look up table is employed to facilitate generating the desired scheduling and amplification of the servo error 206 as a function of the return spring direction 208. It will be appreciated that while an exemplary embodiment has been described and illustrated with reference to look up tables, other methodologies for implementing the disclosed functions are possible and may include, but not be limited to multiplication, offsets, integration, scheduling, tables, and the like, including combinations of the foregoing.

Figure 6:
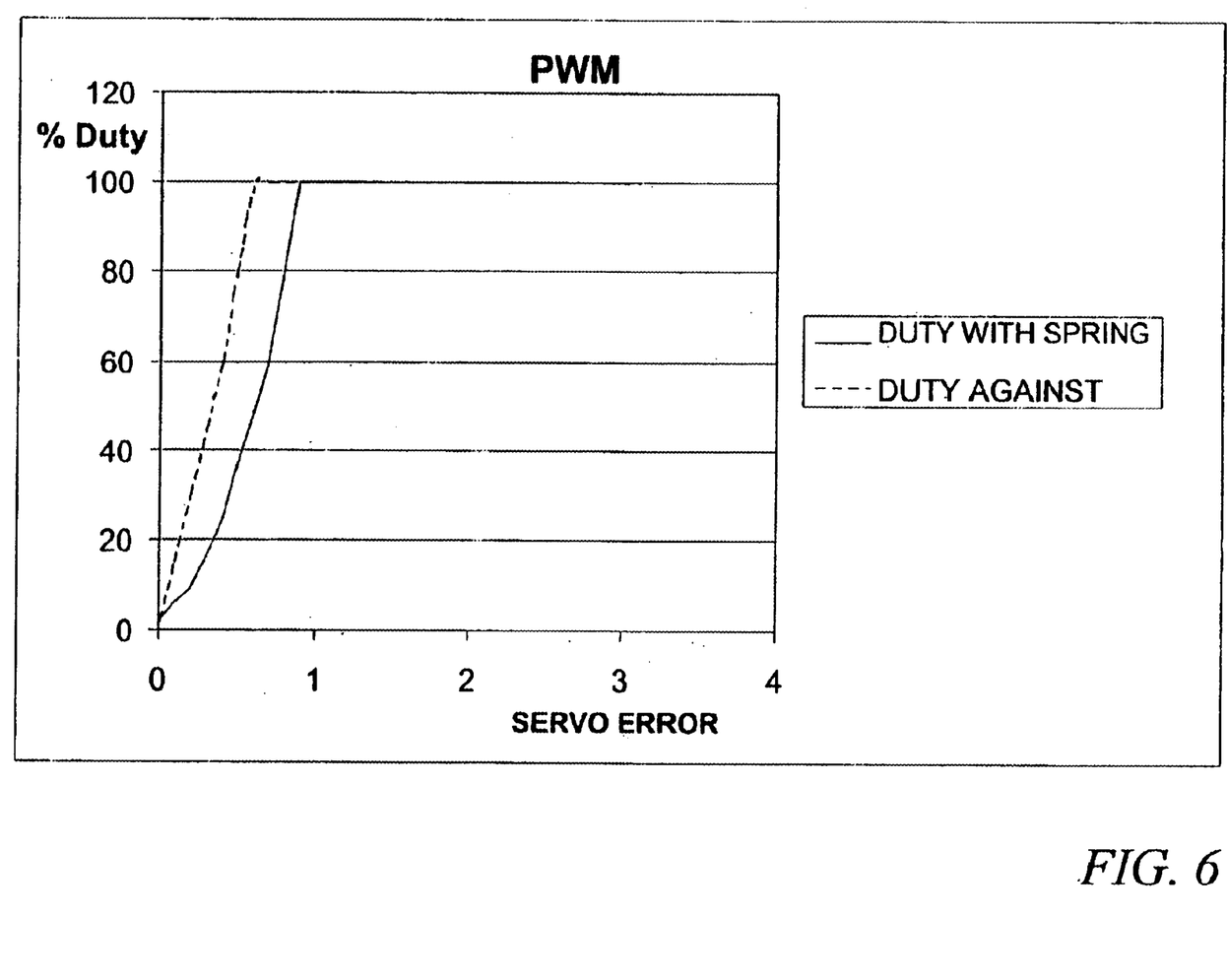
FIG. 6 depicts an exemplary percentage duty cycle as a function of the servo error command.

In an exemplary embodiment, the PWM look up process 120 applies variable percentage duty cycle commands to the motor 46 as a function of the direction of travel of the return spring 70, and the servo error command. In an exemplary embodiment two ratios are applied in a look up table for PWM duty cycles, one for commands with the direction of the return spring 70, another for commands against the direction of the return spring 70. FIG. 6 depicts an exemplary percentage duty cycle as a function of the servo error command for commands with and against the return spring 70. It is noteworthy to appreciate that the direction of motion is accounted for in the two curves depicted. In particular, a shallower gain or curve exhibiting a gain reduced from a nominal for commands with the return spring 70, and a larger, more aggressive gain exhibiting an increase from a nominal gain for commands against the return spring 70. The variation in duty cycle facilitates tuning the values of the look up table(s) to eliminate undesirable response characteristics of the motor 46 and system 10.

The system and methodology described hereinbefore provides a robust design and method to stabilize the rear wheel steering angle, thereby improving high-speed directional stability and low speed turning of a vehicle. In addition, the disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling an angle of a steerable wheel in a vehicle with electric power assisted steering with an electric motor and a return spring, comprising:

determining a desired steerable wheel angle;

obtaining an actual steerable wheel angle of said vehicle; and determining a direction for said electric motor;

generating command, responsive to said desired steerable wheel angle, said actual steerable wheel angle, and said direction;

said command resulting in a torque generated by said electric motor operably connected to said steerable wheel for controlling said actual steerable wheel angle.

2. The method of claim 1 wherein said desired steerable wheel angle is responsive to a hand wheel angle and a vehicle speed.

3. The method of claim 2 wherein said desired steerable wheel angle is responsive to a ratio of said hand wheel angle scheduled as a function of said vehicle speed.

4. The method of claim 3 wherein said command is responsive to a servo error corresponding to a difference between said desired steerable wheel angle and said actual steerable wheel angle.

5. The method of claim 4 wherein said command is lower when said direction is with said return spring than when said direction against said return spring.

6. The method of claim 5 wherein said direction is against said return spring if:

said actual steerable wheel angle is greater than zero degrees and if said desired steerable wheel angle is greater than said actual steerable wheel angle; or said actual steerable wheel angle is less than zero degrees and if said desired steerable wheel angle is less than said actual steerable wheel angle; and wherein said direction is with said return spring if:
said actual steerable wheel angle is greater than zero degrees and said desired steerable wheel angle is less than said actual steerable wheel angle; or
said actual rear wheel angle is less than zero degrees and if said desired rear wheel angle is greater than said actual rear wheel angle.

7. The method of claim 1 wherein said desired steerable wheel angle is a rear wheel angle, said desired steerable wheel angle responsive to a vehicle speed dependent ratio of a front wheel angle.

8. The method of claim 1 wherein said command is responsive to a servo error corresponding to a difference between said desired steerable wheel angle and said actual steerable wheel angle.

9. The method of claim 1, wherein said command is responsive to a look up process comprising a table with entries corresponding to said direction.

10. The method of claim 1, wherein said command is lower when said direction is with said return spring than when said direction is against said return spring.

11. The method of claim 1 wherein said direction is against said return spring, if said actual steerable wheel angle is greater than zero degrees and if said desired steerable wheel angle is greater than said actual steerable wheel angle.

12. The method of claim 1 wherein said direction is with said return spring, if said actual steerable wheel angle is greater than zero degrees and if said desired steerable wheel angle is less than said actual steerable wheel angle.

13. The method of claim 1 wherein said direction is against said return spring if said actual steerable wheel angle is less than zero degrees and if said desired steerable wheel angle is less than said actual steerable wheel angle.

14. The method of claim 1 wherein said direction is with said return spring, if said actual rear wheel angle is less than zero degrees and if said desired rear wheel angle is greater than said actual rear wheel angle.

15. The method of claim 1 wherein said direction is against said return spring if:
said actual steerable wheel angle is greater than zero degrees and if said desired steerable wheel angle is greater than said actual steerable wheel angle; or
said actual steerable wheel angle is less than zero degrees and if said desired steerable wheel angle is less than said actual steerable wheel angle; and
wherein said direction is with said return spring if:
said actual steerable wheel angle is greater than zero degrees and said desired steerable wheel angle is less than said actual steerable wheel angle; or
said actual rear wheel angle is less than zero degrees and if said desired rear wheel angle is greater than said actual rear wheel angle.

16. A vehicle steering system coupled to a steerable wheel, comprising:
a steering rack linked to said steerable wheel;
an electric motor having an output shaft engaged with said steering rack for controlling said steerable wheel;
a position sensor configured to measure an actual steerable wheel angle of said steering rack and thereby said steerable wheel, transmitting said actual steerable wheel angle to a controller;
a return spring, said return spring biased so as to provide a returning force to said steering rack; and
said controller providing a command to said electric motor resulting in a torque generated by said electric motor, said command responsive to said actual steerable wheel angle, a desired steerable wheel angle, and a direction of travel of said steerable wheel.

17. The vehicle steering system of claim 16 wherein said desired steerable wheel angle is responsive to a hand wheel angle and a vehicle speed.

18. The vehicle steering system of claim 17 wherein said desired steerable wheel angle is responsive to a ratio of said hand wheel angle scheduled as a function of said vehicle speed.

19. The vehicle steering system of claim 18 wherein said command is responsive to a servo error corresponding to a difference between said desired steerable wheel angle and said actual steerable wheel angle.

20. The vehicle steering system of claim 19, wherein said command is lower when said direction is with said return spring than when said direction is against said return spring.

21. The vehicle steering system of claim 20 wherein said direction is against said return spring if:
said actual steerable wheel angle is greater than zero degrees and if said desired steerable wheel angle is greater than said actual steerable wheel angle; or
said actual steerable wheel angle is less than zero degrees and if said desired steerable wheel angle is less than said actual steerable wheel angle; and
wherein said direction is with said return spring if:
said actual steerable wheel angle is greater than zero degrees and said desired steerable wheel angle is less than said actual steerable wheel angle; or
said actual rear wheel angle is less than zero degrees and if said desired rear wheel angle is greater than said actual rear wheel angle.

22. The vehicle steering system of claim 16 wherein said desired steerable wheel angle is a rear wheel angle, said desired steerable wheel angle responsive to a vehicle speed dependent ratio of a front wheel angle.

23. The vehicle steering system of claim 16 wherein said command is responsive to a servo error corresponding to a difference between said desired steerable wheel angle and said actual steerable wheel angle.

24. The vehicle steering system of claim 16, wherein said command is responsive to a look up process comprising a table with entries corresponding to said direction.

25. The vehicle steering system of claim 16, wherein said command is lower when said direction is with said return spring than when said direction is against said return spring.

26. The vehicle steering system of claim 16 wherein said direction is against said return spring, if said actual steerable wheel angle is greater than zero degrees and if said desired steerable wheel angle is greater than said actual steerable wheel angle.

27. The vehicle steering system of claim 16 wherein said direction is with said return spring, if said actual steerable wheel angle is greater than zero degrees and if said desired steerable wheel angle is less than said actual steerable wheel angle.

28. The vehicle steering system of claim 16 wherein said direction is against said return spring if said actual steerable wheel angle is less than zero degrees and if said desired steerable wheel angle is less than said actual steerable wheel angle.

29. The vehicle steering system of claim 16 wherein said direction is with said return spring, if said actual rear wheel angle is less than zero degrees and if said desired rear wheel angle is greater than said actual rear wheel angle.

30. The vehicle steering system of claim 16 wherein said direction is against said return spring if:

said actual steerable wheel angle is greater than zero degrees and if said desired steerable wheel angle is greater than said actual steerable wheel angle; or said actual steerable wheel angle is less than zero degrees and if said desired steerable wheel angle is less than said actual steerable wheel angle; and wherein said direction is with said return spring if:
said actual steerable wheel angle is greater than zero degrees and said desired steerable wheel angle is less than said actual steerable wheel angle; or
said actual rear wheel angle is less than zero degrees and if said desired rear wheel angle is greater than said actual rear wheel angle.

31. A storage medium encoded with a machine-readable computer program code for controlling an angle of a steerable wheel in a vehicle with electric power assisted steering with an electric motor and a return spring, said storage medium including instructions for causing controller to implement a method comprising:
determining a desired steerable wheel angle;
obtaining an actual steerable wheel angle of said vehicle; and
determining a direction for said electric motor;
generating command, responsive to said desired steerable wheel angle, said actual steerable wheel angle, and said direction;
said command resulting in a torque generated by said electric motor operably connected to said steerable wheel for controlling said actual steerable wheel angle.

32. The storage medium of claim 31 wherein said desired steerable wheel angle is responsive to a hand wheel angle and a vehicle speed.

33. The storage medium of claim 32 wherein said desired steerable wheel angle is responsive to a ratio of said hand wheel angle scheduled as a function of said vehicle speed.

34. The storage medium of claim 33 wherein said command is responsive to a servo error corresponding to a difference between said desired steerable wheel angle and said actual steerable wheel angle.

35. The storage medium of claim 34, wherein said command is lower when said direction is with said return spring than when said direction against said return spring.

36. The storage medium of claim 35 wherein said direction is against said return spring if:
said actual steerable wheel angle is greater than zero degrees and if said desired steerable wheel angle is greater than said actual steerable wheel angle; or
said actual steerable wheel angle is less than zero degrees and if said desired steerable wheel angle is less than said actual steerable wheel angle; and
wherein said direction is with said return spring if:
said actual steerable wheel angle is greater than zero degrees and said desired steerable wheel angle is less than said actual steerable wheel angle; or
said actual rear wheel angle is less than zero degrees and if said desired rear wheel angle is greater than said actual rear wheel angle.

37. The storage medium of claim 31 wherein said desired steerable wheel angle is a rear wheel angle, said desired steerable wheel angle responsive to a vehicle speed dependent ratio of a front wheel angle.

38. The storage medium of claim 31 wherein said command is responsive to a servo error corresponding to a difference between said desired steerable wheel angle and said actual steerable wheel angle.

39. The storage medium of claim 31, wherein said command is responsive to a look up process comprising a table with entries corresponding to said direction.

40. The storage medium of claim 31, wherein said command is lower when said direction is with said return spring than when said direction is against said return spring.

41. The storage medium of claim 31 wherein said direction is against said return spring, if said actual steerable wheel angle is greater than zero degrees and if said desired steerable wheel angle is greater than said actual steerable wheel angle.

42. The storage medium of claim 31 wherein said direction is with said return spring, if said actual steerable wheel angle is greater than zero degrees and if said desired steerable wheel angle is less than said actual steerable wheel angle.

43. The storage medium of claim 31 wherein said direction is against said return spring if said actual steerable wheel angle is less than zero degrees and if said desired steerable wheel angle is less than said actual steerable wheel angle.

44. The storage medium of claim 31 wherein said direction is with said return spring, if said actual rear wheel angle is less than zero degrees and if said desired rear wheel angle is greater than said actual rear wheel angle.

45. The storage medium of claim 31 wherein said direction is against said return spring if:
said actual steerable wheel angle is greater than zero degrees and if said desired steerable wheel angle is greater than said actual steerable wheel angle; or
said actual steerable wheel angle is less than zero degrees and if said desired steerable wheel angle is less than said actual steerable wheel angle; and
wherein said direction is with said return spring if:
said actual steerable wheel angle is greater than zero degrees and said desired steerable wheel angle is less than said actual steerable wheel angle; or
said actual rear wheel angle is less than zero degrees and if said desired rear wheel angle is greater than said actual rear wheel angle.

46. A computer data signal embodied in a carrier wave for controlling an angle of a steerable wheel in a vehicle with electric power assisted steering with an electric motor and a return spring, said data signal comprising code configured to cause a controller to implement a method comprising:
determining a desired steerable wheel angle;
obtaining an actual steerable wheel angle of said vehicle; and
determining a direction for said electric motor;
generating command, responsive to said desired steerable wheel angle, said actual steerable wheel angle, and said direction;
said command resulting in a torque generated by said electric motor operably connected to said steerable wheel for controlling said actual steerable wheel angle.

47. The computer data signal of claim 46 wherein said desired steerable wheel angle is responsive to a hand wheel angle and a vehicle speed.

48. The computer data signal of claim 47 wherein said desired steerable wheel angle is responsive to a ratio of said hand wheel angle scheduled as a function of said vehicle speed.

49. The computer data signal of claim 48 wherein said command is responsive to a servo error corresponding to a difference between said desired steerable wheel angle and said actual steerable wheel angle.

50. The computer data signal of claim 49 wherein said command is lower when said direction is with said return spring than when said direction against said return spring.

51. The computer data signal of claim 50 wherein said direction is against said return spring if:
said actual steerable wheel angle is greater than zero degrees and if said desired steerable wheel angle is greater than said actual steerable wheel angle; or
said actual steerable wheel angle is less than zero degrees and if said desired steerable wheel angle is less than said actual steerable wheel angle; and
wherein said direction is with said return spring if:
said actual steerable wheel angle is greater than zero degrees and said desired steerable wheel angle is less than said actual steerable wheel angle; or
said actual rear wheel angle is less than zero degrees and if said desired rear wheel angle is greater than said actual rear wheel angle.

52. The computer data signal of claim 46 wherein said desired steerable wheel angle is a rear wheel angle, said desired steerable wheel angle responsive to a vehicle speed dependent ratio of a front wheel angle.

53. The computer data signal of claim 46 wherein said command is responsive to a servo error corresponding to a difference between said desired steerable wheel angle and said actual steerable wheel angle.

54. The computer data signal of claim 46, wherein said command is responsive to a look up process comprising a table with entries corresponding to said direction.

55. The computer data signal of claim 46, wherein said command is lower when said direction is with said return spring than when said direction is against said return spring.

56. The computer data signal of claim 46 wherein said direction is against said return spring, if said actual steerable wheel angle is greater than zero degrees and if said desired steerable wheel angle is greater than said actual steerable wheel angle.

57. The computer data signal of claim 46 wherein said direction is with said return spring, if said actual steerable wheel angle is greater than zero degrees and if said desired steerable wheel angle is less than said actual steerable wheel angle.

58. The computer data signal of claim 46 wherein said direction is against said return spring if said actual steerable wheel angle is less than zero degrees and if said desired steerable wheel angle is less than said actual steerable wheel angle.

59. The computer data signal of claim 46 wherein said direction is with said return spring, if said actual rear wheel angle is less than zero degrees and if said desired rear wheel angle is greater than said actual rear wheel angle.

60. The computer data signal of claim 46 wherein said direction is against said return spring if:
said actual steerable wheel angle is greater than zero degrees and if said desired steerable wheel angle is greater than said actual steerable wheel angle; or
said actual steerable wheel angle is less than zero degrees and if said desired steerable wheel angle is less than said actual steerable wheel angle; and
wherein said direction is with said return spring if:
said actual steerable wheel angle is greater than zero degrees and said desired steerable wheel angle is less than said actual steerable wheel angle; or
said actual rear wheel angle is less than zero degrees and if said desired rear wheel angle is greater than said actual rear wheel angle.

* * * * *